US011093238B2

(12) United States Patent
Catling et al.

(10) Patent No.: US 11,093,238 B2
(45) Date of Patent: *Aug. 17, 2021

(54) COLLABORATIVE SOFTWARE DEVELOPMENT

(71) Applicant: INTERNATIONAL BUSINESS MACHINES CORPORATION, Armonk, NY (US)

(72) Inventors: Samantha Catling, Winchester (GB); Emma Jane Dawson, Eastleigh (GB); Jack Peter Wadsted, Southampton (GB); Ashleigh Shona Denholm, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/675,320

(22) Filed: Nov. 6, 2019

(65) Prior Publication Data
US 2021/0132939 A1 May 6, 2021

(51) Int. Cl.
*G06F 8/70* (2018.01)
*G06F 11/32* (2006.01)
*G06F 8/10* (2018.01)

(52) U.S. Cl.
CPC .............. *G06F 8/70* (2013.01); *G06F 8/10* (2013.01); *G06F 11/327* (2013.01)

(58) Field of Classification Search
CPC ............ G06F 8/70; G06F 8/10; G06F 11/327
USPC ................................ 717/101–107, 120–123
See application file for complete search history.

(56) References Cited

U.S. PATENT DOCUMENTS

| 5,675,802 A | * | 10/1997 | Allen | G06F 8/71 717/103 |
| 5,678,052 A | * | 10/1997 | Brisson | G06F 8/30 704/4 |
| 6,199,193 B1 | * | 3/2001 | Oyagi | G06F 8/10 717/101 |
| 7,146,347 B1 | * | 12/2006 | Vazquez | G06F 8/34 706/12 |
| 7,457,791 B1 | * | 11/2008 | Garg | G06F 11/0751 706/45 |
| 7,493,294 B2 | * | 2/2009 | Flinn | G06N 3/126 706/12 |

(Continued)

OTHER PUBLICATIONS

Hattori et al, "Syde: A Tool for Collaborative Software Development", ACM, pp. 235-238 (Year: 2010).*

(Continued)

*Primary Examiner* — Anil Khatri
(74) *Attorney, Agent, or Firm* — Teddi E. Maranzano

(57) ABSTRACT

Embodiments for collaborative software development project having a plurality of contributors is provided. One such embodiment comprises determining if the contributor of a newly provided contribution to program code of the collaborative software development project is a primary contributor. If it is determined that the contributor is the primary contributor, the program code of the collaborative software development project is analyzed to determine one or more software development rules. Program code of the collaborative software development project may then be modified based on the determined one or more software development rules.

17 Claims, 4 Drawing Sheets

(56) References Cited

U.S. PATENT DOCUMENTS

| | | | | |
|---|---|---|---|---|
| 7,559,057 | B2* | 7/2009 | Castelli | G06F 11/3636 706/16 |
| 7,926,029 | B1* | 4/2011 | Stoyen | G06F 8/20 717/117 |
| 8,006,223 | B2* | 8/2011 | Boulineau | G06Q 10/06313 717/101 |
| 8,050,907 | B2* | 11/2011 | Baisley | G06F 40/211 704/9 |
| 8,418,137 | B2* | 4/2013 | Hoche | G06F 9/3017 717/121 |
| 8,572,560 | B2* | 10/2013 | Drissi | G06F 8/71 717/120 |
| 8,600,920 | B2* | 12/2013 | Flynn | G06N 20/00 706/45 |
| 8,935,654 | B2* | 1/2015 | Sengupta | G06F 11/3684 717/101 |
| 8,977,689 | B2* | 3/2015 | Beaven | G06Q 10/0639 709/204 |
| 9,330,257 | B2* | 5/2016 | Valencia | G06F 21/552 |
| 9,535,664 | B1* | 1/2017 | Foster | G06F 8/427 |
| 9,600,244 | B1 | 3/2017 | Hwang | |
| 10,528,741 | B1* | 1/2020 | Collins | G06F 8/70 |
| 10,691,726 | B2* | 6/2020 | Rapaport | G06F 16/285 |
| 10,866,792 | B1* | 12/2020 | Tomlin | G06F 8/70 |
| 2011/0055799 | A1 | 3/2011 | Kaulgud | |
| 2016/0026648 | A1 | 1/2016 | Ghosh | |
| 2016/0041953 | A1 | 2/2016 | Derose et al. | |
| 2016/0196496 | A1 | 7/2016 | Chatterjee et al. | |
| 2016/0371079 | A1 | 12/2016 | Balasubramanian | |
| 2017/0220535 | A1 | 8/2017 | Olsen et al. | |
| 2017/0315903 | A1 | 11/2017 | David | |

OTHER PUBLICATIONS

Peng et al, "Collaborative Software Development Platforms for Crowdsourcing", IEEE, pp. 30-36 (Year: 2014).*

Treude et al, "Work Item Tagging: Communicating Concerns in Collaborative Software Development", IEEE, pp. 19-34 (Year: 2012).*

Hildenbrand et a, "Approaches to Collaborative Software Development", IEEE, pp. 523-528 (Year: 2008).*

Layman, "Changing Students' Perceptions: An Analysis of the Supplementary Benefits of Collaborative Software Development", IEEE, pp. 1-8 (Year: 2006).*

De Souza et al, "Management of Interdependencies in Collaborative Software Development", IEEE, pp. 1-10 (Year: 2003).*

Mashayekhi et al, "Distributed, Collaborative Software Inspection", ACM, pp. 66-75 (Year: 1993).*

Goldman, "RoleBased Interfaces for Collaborative Software", ACM, pp. 23-26 (Year: 2011).*

IBM: List of IBM Patents or Patent Applications Treated as Related (Appendix P), Nov. 14, 2019, 2 pages.

Pending U.S. Appl. No. 16/675,313, filed Nov. 6, 2019, entitled "Collaborative Development", 27 pages.

Ballman, "SEI CERT C++ Coding Standard", Rules for Developing Safe, Reliable, and Secure Systems in C++, 2016 Edition, Software Engineering Institute, Carnegie Mellon University, Copyright 2017 Carnegie Mellon University, 435 pages.

https://docs.microsoft.com/en-us/visualstudio/ide/create-portable-custom-editor-options?view=vs-2017, "Create portable, custom editor settings with EditorConfig", Jul. 31, 2018, Microsoft Docs, 11 pages.

https://softwareengineering.stackexchange.com/questions/119455/how-to-deal-with-different-programming-styles-in-a-team?rq=1. "How to deal with different programming styles in a team?", Software Engineering, Sponsored by stackoverflow, Accessed on Oct. 18, 2019, 1 page.

Parr et al., "Towards a Universal Code Formatter through Machine Learning", SLE'16, Oct. 31-Nov. 1, 2016, Amsterdam, Netherlands, © 2016 ACM, Abstract, pp. 137-151.

* cited by examiner

COLLABORATIVE SOFTWARE DEVELOPMENT

BACKGROUND

The present invention relates generally to the field of collaborative software development, and in particular to a method for a collaborative software development project having a plurality of contributors.

Different contributors to a collaborative software development project employing different standards can make it difficult to ensure code consistency and/or reliability. To address this issue, regular code reviews are performed during the collaborative software development project in order to check that contributors to the project are following a pre-agreed standard. However, this is time consuming task and may require reformatting of large amounts of program code.

SUMMARY

The present invention provides a method for a collaborative software development project having a plurality of contributors. Such a method may be computer-implemented.

The present invention further provides a computer program product including computer program code for implementing a method when executed by a processing unit. The present invention also provides a processing system adapted to execute this computer program code.

The present invention provides a middleware system for a collaborative software development project having a plurality of contributors.

According to an aspect of the invention, there is provided computer-implemented method for a collaborative software development project having a plurality of contributors comprising a primary contributor and at least one secondary contributor. The method comprises, responsive to a contribution being made to program code of the collaborative software development project, determining if the contributor of the contribution is the primary contributor. Responsive to determining the contributor is the primary contributor, program code of the collaborative software development project is analyzed. Based on the results of analyzing program code, one or more software development rules are then determined. Program code of the collaborative software development project is then modified based on the determined one or more software development rules.

According to another aspect of the invention, there is provided a computer program product. The computer program product comprises a computer readable storage medium having program instructions embodied therewith, the program instructions executable by a processing unit to cause the processing unit to perform a method according to an embodiment.

According to another aspect of the invention, there is provided a computer system comprising at least one processor and the computer program product according to an embodiment. At least one processor is adapted to execute the computer program code of said computer program product.

According to yet another aspect of the invention, there is provided a system for a collaborative software development project having a plurality of contributors comprising a primary contributor and at least secondary contributor. The system comprises an identification component that, responsive to a contribution being made to program code of the collaborative software development project, determines if contributor of the contribution is the primary contributor. The system also comprises a code analysis component that, responsive to determining the contributor is the primary contributor, analyzes program code of the collaborative software development project. The system further comprises a rule component that determines one or more software development rules based on the results of analyzing program code. The system yet further comprises a code modification component that modifies program code of the collaborative software development project, based on the determined one or more software development rules.

BRIEF DESCRIPTION OF THE DRAWINGS

Preferred embodiments of the present invention will now be described, by way of example only, with reference to the following drawings, in which.

DETAILED DESCRIPTION

Figure 1:
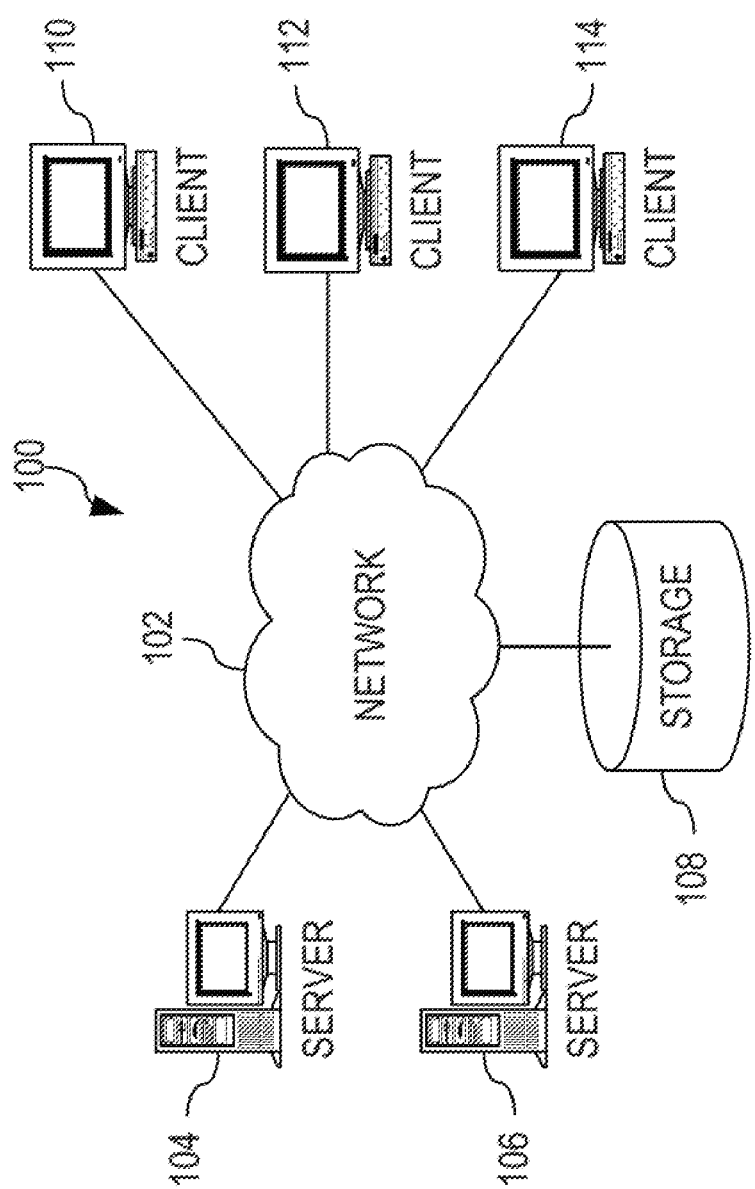
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention. Further, a component may be an integration flow that is executed by one or more processing units.

Provided are embodiments for defining and applying software development rules for a collaborative software development project having a plurality of contributors. In such embodiments, a primary (i.e. lead or principal) contributor of the project may be defined, and other contributors to the project may be defined as secondary (i.e. assistant or deputy) contributors. The primary contributor may be a more experienced and senior member of the collaboration, and may define the programming rules and standards that the other. When the primary contributor provides a contribution to the project, program code of the project may be analyzed to determine rules (i.e. coding standards or principles) that apply to the project. Based on such rules, program code of the project (e.g. new or previous contributions of the primary contributor) may be modified so as to ensure that it adheres to the determined rules. In this way, contributions to the collaborative software development project may be automatically and dynamically processed and modified so as to ensure consistency with coding standards or rules, and theses standard or rules may be defined according to contributions made by the primary contributor. A single, trusted or responsible contributor may therefore influence and/or define the software development rules used for a collaborative software development project, thus preventing other contributors from changing or influencing the software development rules.

Embodiments may thus dynamically learn coding rules or standards and apply them in a collaborative development project. For instance, code contributions to the project may be reformulated according to the rules, and this may be done in real-time (i.e. at the time a contribution is made) and/or retrospectively to previous contributions. Program code of a collaborative software development project may therefore be automatically modified and reformulated so as to adhere to software development rules, and such rules may be repeatedly redefined according to contributions made by a primary contributor. In this way, the software development rules for a collaborative software development project may be changed or adapted by a single, primary contributor. Centralized control and/or modification of software development rules for a collaborative software development project may therefore be facilitated by embodiments.

By way of example, embodiments may leverage known tools or applications for defining software development rules. An example of one such tool/application is CodeBuff. CodeBuff is a tool which is adapted to learn rules from a manually-provided document. CodeBuff may also apply the learnt rules to another document. According to conventional approaches, CodeBuff would have to be manually re-run when a source document is amended in order for new rules to be applied. However, embodiments may avoid this manual and repetitive process. For instance, embodiments may continuously review code contributions as they are provided to a collaborative project and determine who is making the contributions. If it is determined that a primary (i.e. lead, principal or head) contributor is making the contributions, the program code may be processed with the CodeBuff tool and software development rules then determined in real-time. It is to be understood that other approaches or tools for defining software development rules may be employed. For example, a naïve Bayesian machine-learning model for spam filtering is known which may correlate the use of tokens with a source material and then calculate the probability that they match up. By way of further example Guesslang is a known machine-learning application that can detect the programming language of a given source code, and it learns itself how to classify source by reading examples. This demonstrates that a machine-learning model (such as a naïve Bayesian model) can be trained to learn syntax and styling of programming languages.

Further, for any new rules that are determined (i.e. those not already associated with the project), these may be added (e.g. linked, stored or associated) to the project and applied to subsequent contributions. The new rules may be applied retrospectively to previous contributions so as that ensure consistency or adherence with all rules is maintained. Embodiments may therefore apply newly determined software development rules to retrospective, current, and future code contributions in a dynamic and/o automatic manner.

Accordingly, it will be appreciated that embodiments may provide the following benefits:

Speed up collaborative coding—for example, embodiments may remove a need for code refinement after code is contributed for the first time;

Automatic adherence to a preferred coding convention and/or style—Embodiments may ensure that all program code follow the same convention, and this need not necessarily have to be a standard coding format;

Improved scalability—Embodiments may be highly scalable. For instance, they may be applied at an enterprise and/or a single project level.

Support Remote working—Collaborative working whilst ensuring code consistency is supported by embodiments, thus facilitating collaboration between multiple contributors across various locations.

Learning Support—Embodiments may help junior/trainee software developers obtain experience with more advanced coders without the advanced coder necessarily having to provide close supervision.

By way of example, embodiments may provide a computer-implemented method for a collaborative software development project having a plurality of contributors comprising a primary contributor and at least one secondary contributor. The method may comprise determining if the contributor of a newly provided contribution to program code of the collaborative software development project is the primary contributor. If it is determined that the contributor is the primary contributor, the method may automatically analyze program code of the collaborative software development project to determine one or more software development rules. Program code of the collaborative software development project may then be modified based on the determined one or more software development rules. This may entail altering or adapting some of the code to reflect new rules and/or rule changes. However, if the program code is determined to adhere to the rules, the program code may remain unchanged. Such embodiments may therefore dynamically and automatically ensure that program code of a collaborative software development project adheres to coding standards or practices set by the primary contributor.

Some embodiments may also comprise associating the determined one or more software development rules with the collaborative software development project. In this way, software development rules defined specifically for the collaborative software development project may be connected to the project and thus be made available for subsequent use in relation to the project.

By way of example, determining one or more software development rules may comprise using a tool or application that detects the programming language and formats the source code accordingly. Embodiments may therefore make use of conventional tools, rather than requiring development of proprietary tools. This may reduce associated costs and/or complexity of collaborative software development projects.

An embodiment may further comprise: analyzing the contribution to determine if the contribution adheres to the determined one or more software development rules. Responsive to determining the contribution does not adhere to the determined one or more software development rules, a warning notification may then be generated. For instance, if, as the primary contributor is writing new program code, a contradiction between the code and the rules is determined (e.g. differing formatting conventions) it may be indicated to the primary contributor (e.g. in a similar way to a spelling or compilation error). For example, two or more contradicting lines of code may be automatically detected and communicated to the primary contributor.

Further, such embodiments may also comprise determining a response of the primary contributor to the generated warning notification. The determined one or more software development rules may then be modified (e.g. updated or refined) based on the determined response of the primary contributor. For instance, if there is a deliberate reason for the contradiction in the new code in the example of the paragraph above, the primary contributor may indicate this, and a new rule can be defined to take account of the primary contributor response.

Some embodiments may also comprise, responsive to determining the identified contributor is not the primary contributor, analyzing the contribution to determine if the contribution adheres to the determined one or more software development rules. Then, responsive to determining the contribution does not adhere to the determined one or more software development rules, the contribution may be modified based on the determined one or more software development rules. By way of example, modifying the contribution may comprise: employing a coding standards analytics and compliance tool. An example of such a tool is LDRA Testbed/TBvision, which employs a static analysis engine and code visualization capability that helps enforce compliance with a coding standard. It also indicates software flaws that might otherwise pass through a standard build and test process. Another exemplary tool is LDRArule which is a stand-alone rules checker. Yet another exemplary tool that may be employed by an embodiment is known as Resource Standard Metrics (RSM). RSM is a source code metrics and quality analysis tool which provides a standard method for analyzing C, ANSI C++, C # and Java™ source code across operating systems. RSM supports virtually any operating system. Java and all Java-based trademarks and logos are trademarks or registered trademarks of Oracle and or its affiliates.

Also, analyzing the contribution may comprise processing software code of the contribution with a machine learning algorithm. Embodiments may therefore employ one or more of a wide range of existing algorithms to process and analyze software code contributions. In this way, implementation cost and/or complexity may be reduced.

Embodiments may be implemented in conjunction with an existing collaborative software coding environment or application. In this way, the functionalities and/or utility of collaborative software coding environments/applications may be improved upon by incorporating embodiments.

FIG. 1 depicts an exemplary distributed system in which various embodiments may be implemented. A distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first 104 and second 106 servers are connected to the network 102 along with a storage unit 108. The storage unit 108 may include the source code repositories for one or more collaborative software development projects, as well as containing the rules associated with the projects. In addition, clients 110, 112, and 114 are also connected to the network 102. The clients 110, 112, and 114 may be edge devices, for example, personal computers, network computers, IoT devices, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Those of ordinary skill in the art will appreciate that the architecture and/or hardware in FIG. 1 may vary depending on the implementation. Also, the processes of the illustrative embodiments may be applied to a multiprocessor data processing system, without departing from the scope of the present invention.

As detailed above, embodiments provide a method and system for defining software development rules for a collaborative software development project having a plurality of contributors. By way of further explanation, an embodiment will now be described with respect to distributed communication system including a server hosting a collaborative software development.

Figure 2:
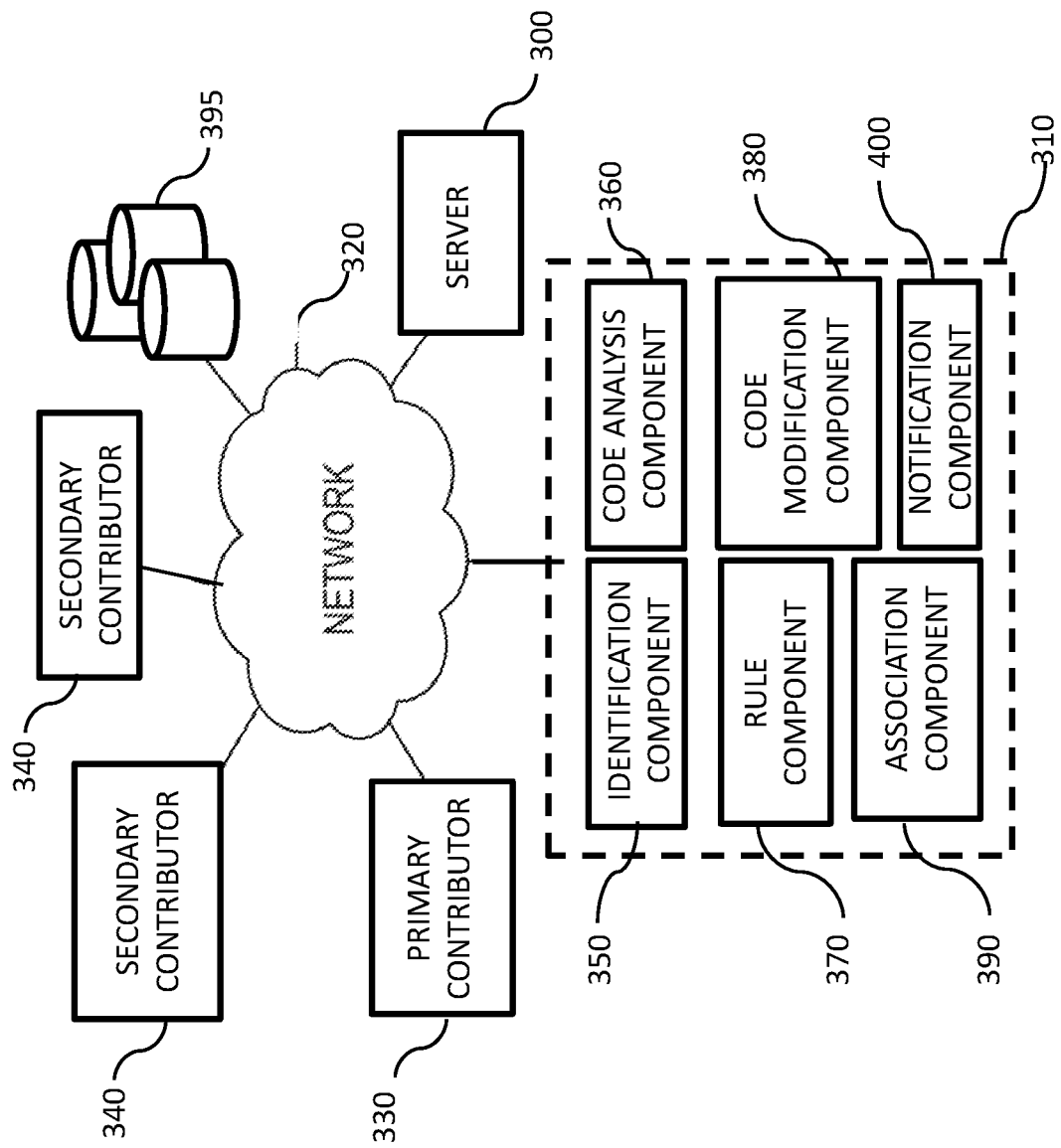
FIG. 2 is a schematic diagram of a distributed communication system according to an embodiment.

Referring to FIG. 2, there is depicted a schematic diagram of a distributed communication system according to an embodiment. The communication system includes a sever 300 (which hosts the collaborative software development application) and a system 310 for defining software development rules for a collaborative software development project according to an embodiment. The server 300 can be accessed by a plurality of contributors via a communication network 320 (e.g. the Internet). Here, the plurality of contributors comprises a primary (i.e. lead, head or principal) contributor 330 and two secondary (i.e. non-primary) contributors 340. By way of example only, the primary contributor 330 is a highly experienced programmer assigned to lead/manage a team responsible for implementing the collaborative software development project, and the secondary contributors 340 are team members with less program development experience than the primary contributor 330. The plurality of contributors communicate with the server 300 in order to write and modify program code in the collaborative software development application.

In the depicted example of FIG. 2, the system 310 for defining software development rules is a middleware system 310 that intercepts, monitors and controls communications between the plurality of contributors and the server 300.

The system 310 comprises an identification component 350 that, responsive to a contribution being made to program code of the collaborative software development project, determines if the contributor of the contribution is the primary contributor.

The system 310 also comprises a code analysis component 360. The code analysis component 360, responsive to determining the identified contributor is the primary contributor, analyzes program code of the collaborative software development project. Based on the results of analyzing program code, a rule component 370 of the system 310 determines whether the analyzed program code complies with, or deviates from, one or more software development rules. By way of example, the rule component 370 of this embodiment may employ a known code analysis tool/application (such as CodeBuff or Guesslang) to determine software development rules.

The system 310 also includes a code modification component 380 that applies the software development rules as needed to modify program code of the collaborative software development project to bring the program code into conformity with the rules. Put another way, based on the rules determined by the rule component 370, program code of the project (e.g. new or previous contributions of the primary contributor) is modified by the code modification component 380 to ensure that it adheres to the determined rules.

In this example of FIG. 2, the system 310 also comprises an association component 390 that associates the determined software development rules with the collaborative software development project. Information about this association is stored in a remotely located database 395 that is accessible via the communication network 320. In this way, information about collaborative software development projects and their associated software development rules may be stored in and retrieved from an accessible database 395.

Even yet further, the system 310 of this example includes a notification component 400 that generates a warning notification in response to determining that a code contribution does not adhere to the determined software development rules for the collaborative software development project.

Figure 3:
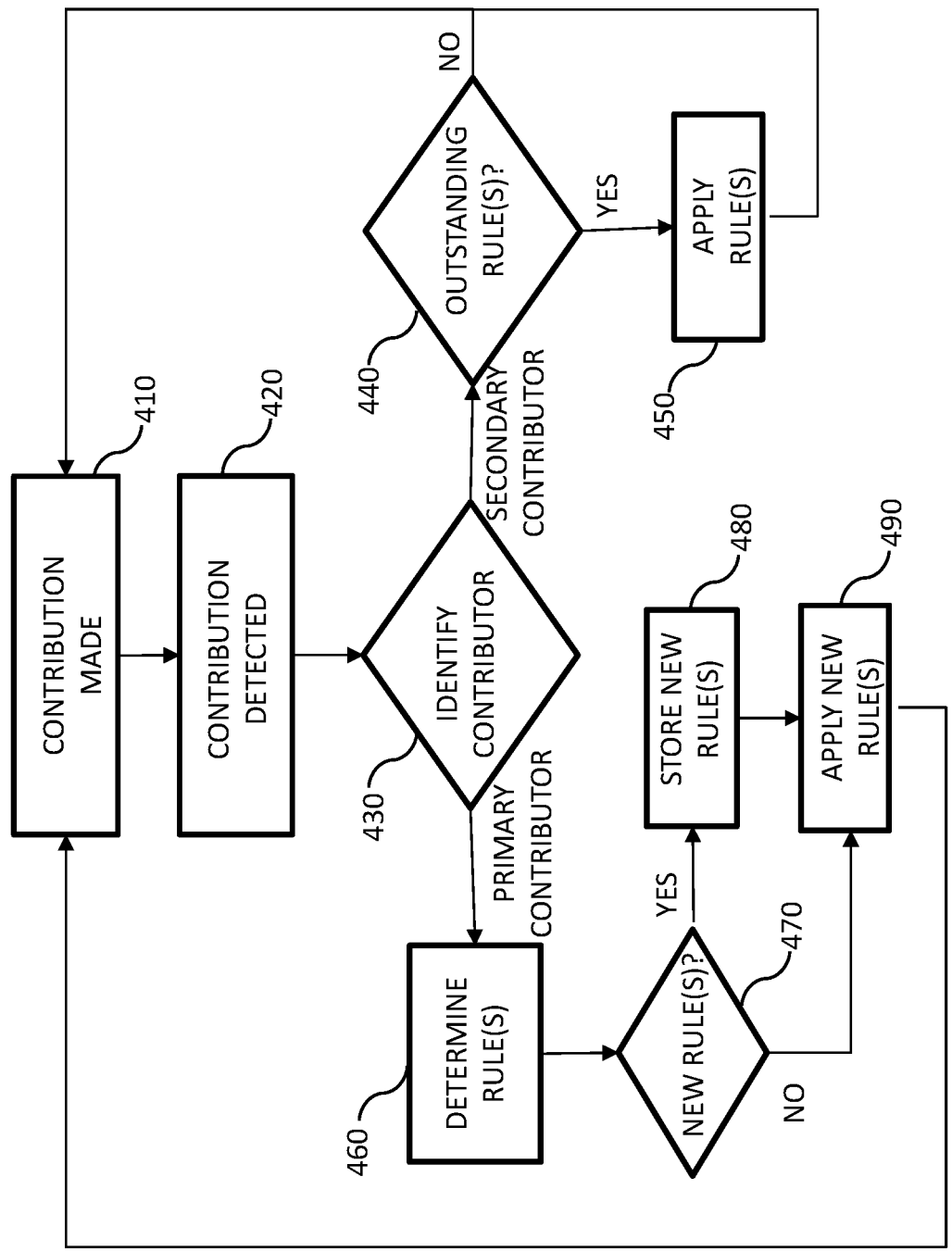
FIG. 3 is flow diagram of a method for defining software development rules for a collaborative software development project having a plurality of contributors according to an embodiment.

FIG. 3 is a flow diagram of a method for defining software development rules for a collaborative software development project having a plurality of contributors. In this example, a first user is assigned a lead coder (i.e. primary contributor) of the collaborative software development project. All other team members are assigned the position of assistant (i.e. secondary contributor).

The method, running within a development environment, monitors for contributions to the project. When a contribution is made (step 410), the contribution to the project code is detected in step 420 and the method proceeds to step 430. In step 430, it is determined if the contributor of the contribution is the lead coder (i.e. primary contributor) or an assistant (i.e. second contributor).

If, in step 430, it is determined that the contributor of the contribution is an assistant (i.e. second contributor), the method proceeds to step 440 in which it is determined if there are any outstanding software development rules for the project. If no rules are outstanding, the method returns to step 410 to monitor for a new contribution to the project. Conversely, if one or more rules are outstanding, the method proceeds to step 450 in which the rules are applied to the contribution (e.g. using the CodeBuff tool) so as to ensure the contribution adheres to the rule(s).

If, in step 430, it is determined that the contributor of the contribution is the lead coder (i.e. primary contributor), the method proceeds to step 460. In step 460, the contribution of the lead coder is processed with the CodeBuff (or similar) tool to determine one or more software development rules that are exhibited by the contribution. Next, it is determined in step 470 whether or not the determined rule(s) are already stored in relation to (i.e. associated with) the project (e.g. stored in a 'rulebook' within the collaboration space). In other words, it is determined in step 470 whether or not the determined rules are new.

If the determined rule(s) already exist for the project, the method proceeds to step 490 in which they are applied to the code of the project. For this, the CodeBuff (or similar) tool is used to apply the new rule(s) to the code of the project.

If the determined rule(s) do not already exist for the project, the method proceeds to step 480 in which the new rule(s) is/are stored in relation with the project, after which the method proceeds to step 490 and applied the new rule(s) to the code of the project.

After completion of step 490, the method returns to step 410 to once again monitor for a new contribution to the project.

By way of example, the code may be reprocessed each time a contributor provides a new contribution. This may be undertaken automatically in response to a predetermined action (e.g. press of certain button or interface element) or only when indicated/requested by the contributor so as to avoid excessive computation.

To illustrate the above described method, one may consider an assistant working on the project alongside the lead coder to deliver a software development project by an urgent deadline. Although the code that assistant contributes may be valid, it may not be formatted consistently with the rest of the source code that was contributed by the lead coder.

As the assistant writes new code for the project, every time he/she presses enter (or confirms entry of a new contribution via a button or interface element for example), the new code is detected and assessed and refactored to be in line with the established rules for the project, so as to ensure the code is consistent. If the assistant contributes lines of code that haven't been defined in the rulebook it will stay the same. However, if the lead coder later writes code that establishes a new rule that is relevant to this previous code, then the assistant earlier-provided code will automatically be modified to adhere to the new rule.

Figure 4:
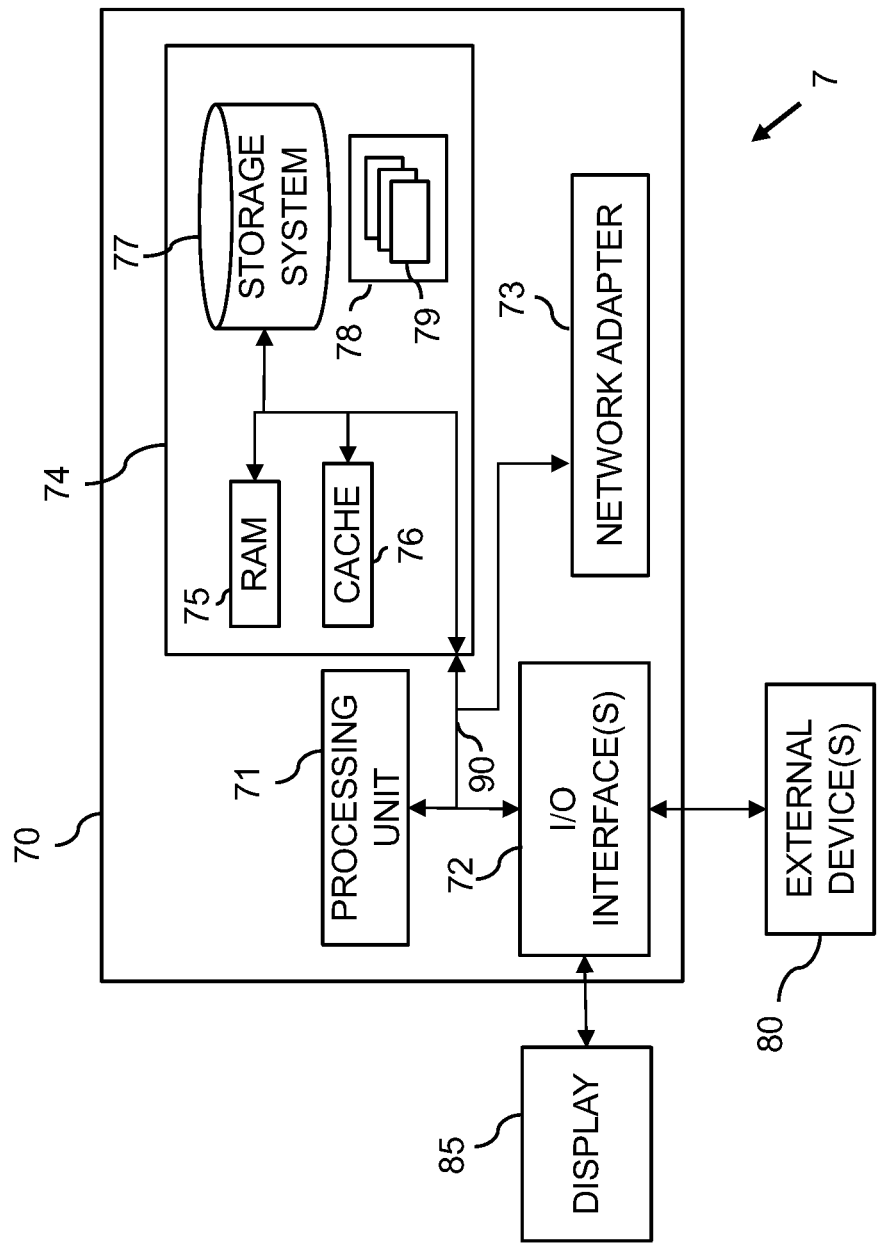
FIG. 4 illustrates a system according to another embodiment.

Embodiments may comprise a computer system 70, which may form part of a networked system 7 illustrated in FIG. 4. For instance, a rule component determines one or more software development rules based on the results of analyzing program code according to an embodiment may be implemented in the computer system 70 (e.g. as a processing unit 71). The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that carry out the functions of the embodiments. For instance, the memory 74 may include a computer program product having program executable by the processing unit 71 to cause the Input/Output (I/O) interface 72 perform a method for defining software development rules for a collaborative software development project according to an embodiment. Program/utility 78, having a set (at least one) of program modules 79, may be stored in memory 74. Program modules 79 generally carry out the functions and/or methodologies of the embodiments for partial write operations to memory.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate determined development rules to devices of a distributed network).

In the context of the present application, where embodiments of the present invention constitute a method, it should be understood that such a method is a process for execution by a computer, i.e. is a computer-implementable method. The steps of the method therefore reflect various parts of a computer program, e.g. parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, Python, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method the method comprising:
    intercepting, by a middleware component interposed between a plurality of contributors and a collaborative software development application, a plurality of program code contributions from the plurality of contributors:
    determining whether any of the plurality of contributors is a primary contributor;
    responsive to identifying the primary contributor, analyzing the program code contribution of the primary contributor;
    based on the presence of the one or more software development rules, determining whether any of the one or more software development rules are previously stored as rules:
    storing, in the collaborative software development application any of the one or more software development rules that are not previously stored as rules;
    based on any of the one or more software development rules differing from any of the stored rules, modifying the corresponding stored rule; and
    applying the modified rule by modifying all code of the software development project, that is associated with the modified stored rule;
    processing, with a machine learning algorithm, software code of the contribution.

2. The method of claim 1, further comprising:
    associating the determined one or more software development rules with the collaborative software development project.

3. The method of claim 1, further comprising:
    analyzing the contribution to determine if the contribution adheres to the determined one or more software development rules; and
    responsive to determining the contribution does not adhere to the determined one or more software development rules, generating a warning notification.

4. The method of claim 3, further comprising:
    determining a response of the primary contributor to the generated warning notification; and
    modifying the determined one or more software development rules based on the determined response of the primary contributor, wherein the primary contributor is a lead programmer.

5. The method of claim 1, further comprising:
    responsive to determining the identified contributor is not the primary contributor, analyzing the contribution to determine if the contribution adheres to the determined one or more software development rules; and
    responsive to determining the contribution does not adhere to the determined one or more software development rules, modifying the contribution based on the determined one or more software development rules.

6. The method of claim 5, wherein modifying the contribution comprises:
    processing the contribution with a coding standards compliance tool.

7. A computer program product, wherein the computer program product comprise a computer readable storage medium having program instructions embodied therewith, the program instructions executable by a processing unit to cause the processing unit to perform a method comprising:
    intercepting, by a middleware component interposed between a plurality of contributors and a collaborative software development application, a plurality of program code contributions from the plurality of contributors;
    responsive to identifying the primary contributor, analyzing the program code contribution of the primary contributor;
    based on the presence of the one or more software development rules, determining whether any of the one or more software development rules are previously stored as rules;
    storing, in the collaborative software development application any of the one or more software development rules that are not previously stored as rules;
    based on any of the one or more software development rules differing from any of the stored rules, modifying the corresponding stored rule: and
    applying the modified rule by modifying all code of the software development project, that is associated with the modified stored rule;
    processing, with a machine learning algorithm, software code of the contribution.

8. The computer program product of claim 7, further comprising:
    associating the determined one or more software development rules with the collaborative software development project.

9. The computer program product of claim 7, further comprising:
    analyzing the contribution to determine if the contribution adheres to the determined one or more software development rules; and
    responsive to determining the contribution does not adhere to the determined one or more software development rules, generating a warning notification.

10. The computer program product of claim 9, further comprising:
    determining a response of the primary contributor to the generated warning notification; and
    modifying the determined one or more software development rules based on the determined response of the primary contributor, wherein the primary contributor is a lead programmer.

11. The computer program product of claim 7, further comprising:
responsive to determining the identified contributor is not the primary contributor, analyzing the contribution to determine if the contribution adheres to the determined one or more software development rules; and
responsive to determining the contribution does not adhere to the determined one or more software development rules, modifying the contribution based on the determined one or more software development rules.

12. The computer program product of claim 11, wherein modifying the contribution comprises:
processing the contribution with a coding standards compliance tool.

13. A system, the system comprising one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
intercepting, by a middleware component interposed between a plurality of contributors and a collaborative software development application, a plurality of program code contributions from the plurality of contributors;
determining whether any of the plurality of contributors is a primary contributor;
responsive to identifying the contributor is the primary contributor, analyzing the program code contribution of the primary contributor;
based on the presence of the one or more software development rules, determining whether any of the one or more software development rules are previously stored as rules;
storing, in the collaborative software development application any of the one or more software development rules that are not previously stored as rules;
based on any of the one or more software development rules differing from any of the stored rules, modifying the corresponding stored rule; and
applying the modified rule by modifying all code of the software development project that is associated with the modified stored rule;
processing the contribution with a coding standards compliance tool; and analyzing a contribution comprises: processing, with a machine learning algorithm, software code of the contribution.

14. The system of claim 13, further comprising:
associating the determined one or more software development rules with the collaborative software development project.

15. The system of claim 13, wherein a code analysis component analyzes the contribution to determine if the contribution adheres to the determined one or more software development rules, and, responsive to determining the contribution does not adhere to the determined one or more software development rules, generate a warning notification.

16. The system of claim 15, further comprising determining a response of the primary contributor to the generated warning notification, and wherein a rule component modifies the determined one or more software development rules based on the determined response of the primary contributor, wherein the primary contributor is a lead programmer.

17. The system of claim 13, further comprising:
responsive to determining the identified contributor is not the primary contributor, analyzing the contribution to determine if the contribution adheres to the determined one or more software development rules; and
responsive to determining the contribution does not adhere to the determined one or more software development rules, modifying the contribution based on the determined one or more software development rules.

* * * * *